(12) United States Patent
Yoshino et al.

(10) Patent No.: US 8,216,723 B2
(45) Date of Patent: Jul. 10, 2012

(54) POLYMER ELECTROLYTE AND ELECTROCHEMICAL DEVICE

(75) Inventors: Akira Yoshino, Tokyo (JP); Hitoshi Shobukawa, Tokyo (JP)

(73) Assignee: Asahi Kasei Kabushiki Kaisha, Osaka-Shi, Osaka (JP)

( * ) Notice: Subject to any disclaimer, the term of this patent is extended or adjusted under 35 U.S.C. 154(b) by 546 days.

(21) Appl. No.: 12/440,208

(22) PCT Filed: Sep. 7, 2007

(86) PCT No.: PCT/JP2007/067519
§ 371 (c)(1),
(2), (4) Date: Mar. 5, 2009

(87) PCT Pub. No.: WO2008/032658
PCT Pub. Date: Mar. 20, 2008

(65) Prior Publication Data
US 2010/0035159 A1      Feb. 11, 2010

(30) Foreign Application Priority Data

Sep. 11, 2006   (JP) .............................. 2006-245331

(51) Int. Cl.
H01M 6/18        (2006.01)
(52) U.S. Cl. ........ 429/317; 429/304; 429/303; 429/300; 429/479
(58) Field of Classification Search .............. 429/317, 429/304, 303, 300, 479
See application file for complete search history.

(56) References Cited

U.S. PATENT DOCUMENTS

| | | | |
|---|---|---|---|
| 4,303,748 A | 12/1981 | Armand et al. | |
| 6,150,455 A | 11/2000 | Takamiya et al. | |
| 6,444,368 B1 * | 9/2002 | Hikmet et al. ................ | 429/300 |
| 6,621,684 B2 | 9/2003 | Shimamoto et al. | |
| 6,991,874 B1 | 1/2006 | Möhwald et al. | |
| 2005/0277027 A1 | 12/2005 | Kim et al. | |
| 2005/0288467 A1 | 12/2005 | Satou et al. | |

FOREIGN PATENT DOCUMENTS

| | | |
|---|---|---|
| EP | 0 059 324 A1 | 9/1982 |
| JP | 54-104541 A | 8/1979 |
| JP | 55-98480 A | 7/1980 |
| JP | 57-143356 A | 9/1982 |
| JP | 58-75779 A | 5/1983 |
| JP | 59-230058 A | 12/1984 |
| JP | 60-31555 A | 2/1985 |
| JP | 60-248724 A | 12/1985 |
| JP | 61-254626 A | 11/1986 |
| JP | 62-30147 A | 2/1987 |
| JP | 1-197974 A | 8/1989 |
| JP | 1-241767 A | 9/1989 |
| JP | 1-284508 A | 11/1989 |
| JP | 5-325986 A | 12/1993 |
| JP | 11-60870 A | 3/1999 |
| JP | 2000-302939 A | 10/2000 |
| JP | 2001-176550 A | 6/2001 |
| JP | 2003-514352 A | 4/2003 |
| JP | 2005-142014 A | 6/2005 |
| JP | 2005-302493 | * 10/2005 |
| JP | 2005-307085 A | 11/2005 |
| JP | 2005-347240 A | 12/2005 |
| JP | 2006-12652 A | 1/2006 |
| JP | 2006-186198 | * 7/2006 |
| RU | 2 136 084 C1 | 8/1999 |
| RU | 2 190 902 C1 | 10/2002 |
| RU | 2 230 402 C1 | 6/2004 |
| RU | 2 241 282 C2 | 11/2004 |
| WO | WO-2004-008558 A2 | 1/2004 |

OTHER PUBLICATIONS

Korean Office Action issued on Dec. 20, 2010 in corresponding Korean Patent Application No. 10-2008-7031997.
Decision on Grant issued Nov. 10, 2009 by the Russian Federation Patent Office in Russian Application No. 2009107919/09.
Fenton et al., "Complexes of alkali metal ions with poly(ethylene oxide)", Polymer, Nov. 1973, vol. 14, pp. 589.
European Office Action, dated Sep. 28, 2010, for European Application No. 07806951.5.
Supplementary European Search Report, dated Sep. 15, 2010, for European Application No. 07806951.5.
Taiwanese Office Action issued on Feb. 24, 2011 in corresponding Taiwan Patent Application No. 096133931.

* cited by examiner

*Primary Examiner* — Laura Weiner
(74) *Attorney, Agent, or Firm* — Birch, Stewart, Kolasch & Birch, LLP

(57) ABSTRACT

A polymer electrolyte; and an electrochemical device utilizing the polymer electrolyte. In accordance with the diffusion of cell-phone and other portable information devices and in accordance with the recent-year development of new use of power source for hybrid electric automobile, etc., enhanced reliability is increasingly demanded on electrochemical devices, such as battery, for use as the power source thereof. Although generally a liquid electrolyte is employed in electrochemical devices, the liquid electrolyte is likely to induce trouble, such as liquid leakage, presenting a major factor for reliability loss. Accordingly, use of a polymer electrolyte in place of the liquid electrolyte to attain an enhancement of reliability is being studied. However, conventional polymer electrolytes have had the problem that it is difficult to simultaneously satisfy ion conductivity and reliability. The problem has been solved by the use of polymer electrolyte (5) having a ketonic carbonyl group wherein the weight ratio of the ketonic carbonyl group is in the range of 15 to 50 wt % based on the weight of the polymer material.

3 Claims, 1 Drawing Sheet

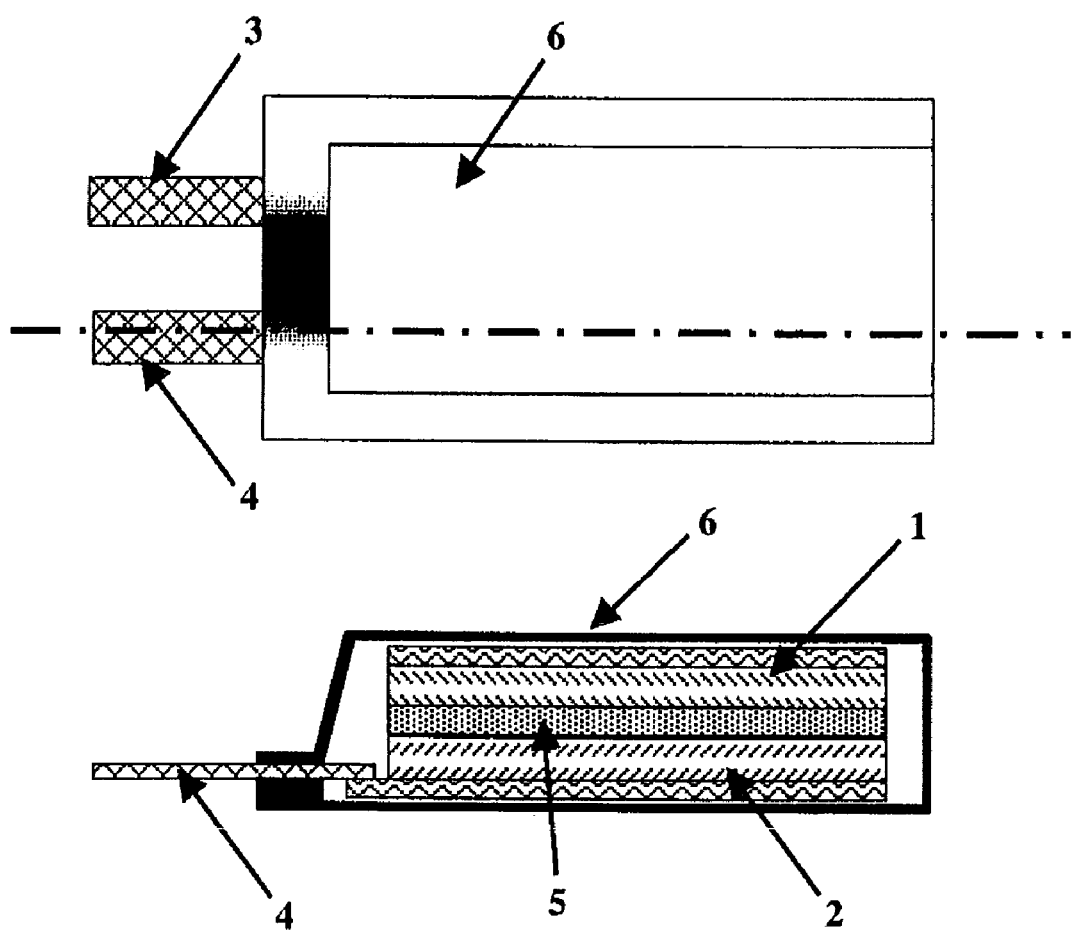

POLYMER ELECTROLYTE AND ELECTROCHEMICAL DEVICE

TECHNICAL FIELD

The present invention relates to a highly ion-conducting polymer electrolyte containing a polymer material having a ketonic carbonyl group wherein the ratio of the weight of the ketonic carbonyl group relative to the weight of the polymer material is 15 wt % to 50 wt %. It further relates to an electrochemical device using the polymer electrolyte, which has excellent liquid leakage resistance, heat resistance, and safety.

BACKGROUND ART

With the widespread use of portable information devices such as laptop computers and cellphones, there is a rapidly growing demand for electrochemical devices such as primary batteries, secondary batteries, and electric double layer capacitors used as power supplies for the devices. Especially, such electrochemical devices are required to be made smaller, more lightweight, and thinner and are expected to be made more reliable. They have recently been finding new applications in power supplies for hybrid electric vehicles and power supplies for energy storage in addition to power supplies for portable information devices. Therefore, they are required to be made much more reliable.

Generally, electrolytic solutions containing electrolyte salts dissolved in solvents are used in electrochemical devices. For this reason, such solutions may cause problems such as liquid leakage and, if they are nonaqueous electrolytic solutions, inflammation and ignition. The use of electrolytic solutions is a major factor contributing to low reliability of the electrochemical devices. Therefore, the problems can be solved by using solid electrolytes instead of electrolytic solutions. Especially, polymer electrolytes are a very promising material because they can easily be made into thin films and also have excellent mechanical properties and pliability.

From such a viewpoint, polymer electrolytes have been studied extensively for a long time. Many proposals have been made since it was reported for the first time that the complexation of a poly(ethylene oxide) polymer with a type of alkali metal salt allows ion conduction to be exhibited (see Non-Patent Document 1).

Patent Document 1 proposes a semisolid gel-state polymer electrolyte composed of polymethylmethacrylate, an electrolyte salt such as LiClO4 or LiBF4, and an organic solvent.

Patent Document 2 proposes an electrochemical generator using an all-solid-state polymer electrolyte that is a solid solution of an electrolyte salt in a polymer containing heteroatoms such as oxygen or nitrogen, and shows polymer materials such as poly(ethylene oxide) and polyamine.

Patent Document 3 proposes a gel-state polymer electrolyte composition containing an electrolyte salt dissolved in a mixture of a polymer having a relative permittivity of 4 or more and an organic solvent having a relative permittivity of 10 or more, and shows polymer materials meeting these requirements such as nitrocellulose, phenolic resin, polyvinylidene fluoride, polyacrylonitrile, and chlorosulfonated polyethylene.

Patent Document 4 discloses a lithium solid electrolyte battery using metallic lithium as the anode and a metal chalcogenide as the cathode, and shows polymer electrolytes using solid electrolytes such as vinylidene fluoride copolymer, polyvinyl chloride, polyvinyl acetate, and polyvinylpyrrolidone.

Patent Document 5 proposes an ion-conducting solid-body composition using a polymer material, and discloses that polysiloxane is an excellent polymer material.

Patent Document 6 discloses a hybrid ionic conductor using an oxyethylene(meta)acrylate polymer.

In addition, Patent Document 7 discloses an aliphatic epoxy resin-based ion-conducting crosslinked resin composition, and Patent Document 8 discloses a polyphosphazene-based polymer electrolyte. Patent Document 9 discloses an ion-conducting polymer composite consisting of polyalkylene carbonate, a metal salt and an organic solvent, and Patent Document 10 discloses a polymer solid electrolyte and a polymer solid electrolyte battery using polyurethane. Patent Document 11 discloses polyvinyl alcohol-based ion-conducting composition and the like.

There are two types of polymer materials that have been proposed for polymer electrolytes as mentioned above: all-solid-state polymer electrolytes including a polymer material and an electrolyte salt and gel-state polymer electrolytes formed by mixing a solvent with a polymer material and an electrolyte salt. The following major problem is left unresolved.

Specifically, all-solid-state polymer electrolytes have not yet achieved ion conduction that is practically satisfactory. In contrast, gel-state polymer electrolytes require the mixing of a large amount of a solvent for practical ion conduction. So, these types of polymer electrolytes are only better in reliability than conventional electrochemical devices using liquid electrolytes, and high reliability that polymer electrolytes have originally been expected to have has not yet been realized.

After that, in line with the commercialization of lithium-ion secondary batteries, the application of polymer electrolytes to lithium-ion secondary batteries was proposed (see Patent Document 12). This triggered more extensive studies of polymer electrolytes, leading to the commercialization of lithium-ion secondary batteries using gel-state polymer electrolytes. As mentioned earlier, however, large amounts of solvents are added to these gel-state polymer electrolytes, leading to failure to achieve the high reliability that polymer electrolytes have originally been expected to have. As a result, most of the lithium-ion secondary battery market involves the use of liquid electrolytes, and lithium-ion secondary batteries using gel-state polymer electrolytes have a very small share of the market.

To solve this problem, various types of polymer materials have since been studied. Patent Document 13 proposes an ion-conducting gel-state polymer electrolyte consisting of polymer A (1 to 40 wt %) having a carbonyl group, polyvinylidene fluoride polymer B (20 to 70 wt %), metal salt C (1 to 50 wt %), and organic solvent D (20 to 85 wt %). The document shows that preferable examples of polymer A having a carbonyl group are polyester, polycarbonate and polyester carbonate, and that other examples include polyamide, polypeptides, polyurethane, and polyketone. However, this system also contains a large amount of an organic solvent and does not necessarily meet the desired ion conduction.

In addition, Patent Document 14 proposes that polymers or copolymers of aromatic monomers having a functional group that acts as ionic ligands are used for all-solid-state polymer electrolytes. It discloses that a monomer having a ketonic carbonyl group can also be used as an example of monomers for the copolymer. However, all copolymers derived from this monomer have a low content of a carbonyl group and low ion conduction.

As mentioned above, all-solid-state polymer electrolytes have not yet provided practical properties at present. On the other hand, lithium-ion secondary batteries using gel-state polymer electrolytes have been put into practical use only in very limited applications for small consumer products, and the development of polymer electrolytes still has major problems at present.

Patent Document 1: JP-A-54-104541
Patent Document 2: JP-A-55-098480
Patent Document 3: JP-A-57-143356
Patent Document 4: JP-A-58-075779
Patent Document 5: JP-A-59-230058
Patent Document 6: JP-A-60-031555
Patent Document 7: JP-A-60-248724
Patent Document 8: JP-A-61-254626
Patent Document 9: JP-A-62-030147
Patent Document 10: JP-A-01-197974
Patent Document 11: JP-A-01-284508
Patent Document 12: JP-A-01-241767
Patent Document 13: JP-A-11-060870
Patent Document 14: JP-A-2006-012652
Non-Patent Document 1: P. V. Wright, Polymer, 14, 589 (1973)

DISCLOSURE OF THE INVENTION

Problems to be Solved by the Invention

As mentioned above, it was difficult to use the conventional polymer electrolytes to make ion conduction compatible with reliability. Especially, polymer electrolytes have recently been finding new applications in large products requiring higher reliability such as hybrid electric vehicles, and there is a growing need for the reliability that polymer electrolytes originally have. In these large product applications, such products are usually operated at a high voltage of 100 V or more, and in order to realize bipolar electrodes that have the most reasonable electrode structure for the use at such a high voltage, polymer electrolytes having high ion conductivity and reliability are necessary.

The present invention has been made to solve these problems, and provides an all-solid-state polymer electrolyte having high ion conductivity achieved by the selection of a specific polymer material or a gel-state polymer electrolyte having high ion conductivity achieved by the addition of a solvent in small enough amounts to prevent the reduction of the reliability. Also, the present invention provides electrochemical devices having excellent output characteristics and high reliability by using these polymer electrolytes.

The present inventors conducted extensive studies to solve the problems above. They found that the problems can be solved by using a polymer material having a ketonic carbonyl group wherein the ratio of the weight of the ketonic carbonyl group relative to the weight of polymer material is 15 wt % to 50 wt %. This finding led us to complete the present invention.

Means for Solving the Problems

In other words, the polymer electrolytes of the present invention are characterized in that they contain a polymer material having a ketonic carbonyl group wherein the ratio of the weight of the ketonic carbonyl group relative to the weight of the polymer material is 15 wt % to 50 wt %.

In addition, the electrochemical devices of the present invention are characterized in that they use the polymer electrolytes of the present invention.

Advantages of the Invention

The polymer electrolytes of the present invention have the advantage of being able to make ion conduction compatible with reliability. In addition, the electrochemical devices of the present invention have the advantage of having high reliability and excellent output characteristics.

BEST MODE FOR CARRYING OUT THE INVENTION

A detailed description of the present invention is given below.

One of the features of the present invention is that a polymer material having a ketonic carbonyl group wherein the ratio of the weight of the ketonic carbonyl group relative to the weight of the polymer material is 15 wt % to 50 wt % is used as a polymer material.

Here, a ketonic carbonyl group refers to a carbonyl group where the two atoms adjacent to the carbonyl group are carbon atoms. It excludes a carboxyl group and an amide group that have an oxygen atom and a nitrogen atom adjacent to a carbonyl group, respectively. In addition, a ketonic carbonyl group may be present in the main chain of a polymer, and it is preferable that they are present only in side chains, not in the main chain of the polymer.

Polymer materials having a ketonic carbonyl group have photosensitivity based on the carbonyl group present, and have long drawn attention as photosensitive polymer materials and easily photodegradable polymer materials. For example, JP-A-50-007849 proposes a photodegradable resin composition containing 0.5 to 10 wt % (as vinyl ketone monomer units) of a vinyl ketone copolymer in a polymer material composed mainly of polyvinyl chloride.

The present invention is based on the finding that a polymer electrolyte having high ion conductivity can be obtained when a polymer material having a ketonic carbonyl group wherein the ratio of the weight of the ketonic carbonyl group relative to the weight of the polymer material is 15 wt % to 50 wt % is used.

General polymer materials having a ketonic carbonyl group used in the present invention include polymers of unsaturated monomers having a ketonic carbonyl group. Such unsaturated monomers include unsaturated ketone compounds such as methyl vinyl ketone, ethyl vinyl ketone, n-hexyl vinyl ketone, phenyl vinyl ketone, and methyl isopropenyl ketone.

In addition, such polymer materials may also be copolymers of these monomers and other unsaturated monomers. Other unsaturated monomers that are converted into such copolymers include unsaturated nitrile monomers such as acrylonitrile and methacrylonitrile, unsaturated carboxylic acid monomers such as acrylic acid, methacrylic acid, maleic acid, itaconic acid, and maleic anhydride and their salts, acrylic ester monomers and methacrylic ester monomers such as methyl acrylate, ethyl acrylate, butyl acrylate, methyl methacrylate, ethyl methacrylate, and hydroxyethyl methacrylate, α-olefin monomers such as ethylene, propylene, 1-butene, 1-hexene, 1-octene, and 1-decene, alkenyl aromatic monomers such as styrene, α-methylstyrene, and p-methylstyrene, vinyl monomers such as vinyl formate, vinyl acetate, and vinyl chloride, vinylidene monomers such as vinylidene chloride and vinylidene fluoride, and vinyl ether monomers such as methyl vinyl ether and ethyl vinyl ether.

In addition, such polymer materials may also be graft copolymers of unsaturated monomers having a ketonic carbonyl group and other polymers.

The preferable weight-average molecular weight of the polymer materials having a ketonic carbonyl group used in the present invention is 5,000 to 1,000,000, and more preferably 10,000 to 1,000,000.

In addition, the polymer material having a ketonic carbonyl group used in the present invention and another polymer material may be mixed to manufacture a polymer electrolyte. In such a case, the ratio of the weight of the polymer material having a ketonic carbonyl group used in the present invention relative to the whole weight of the polymer material is 45 wt % or more, and more preferably 66.7 wt % or more.

The ratio of the weight of the ketonic carbonyl group contained in the polymer material having a ketonic carbonyl group used in the present invention relative to the weight of the polymer material must be 15 wt % to 50 wt %. It is more preferably 18 wt % to 50 wt % and most preferably 20 wt % to 50 wt %. If the ratio of the weight of the ketonic carbonyl group relative to the weight of the polymer material is less than 15 wt %, only polymer electrolytes having low ion conductivity can be obtained. In contrast, if the ratio of the weight of the ketonic carbonyl group relative to the weight of the polymer material exceeds 50 wt %, only brittle polymer electrolytes having poor solubility and fabricability can be obtained.

Preferable electrolyte salts used in the polymer electrolytes of the present invention include inorganic salts such as $LiClO_4$, $LiBF_4$, $LiPF_6$, LiBr, LiI, LiSCN, and $LiAsF_6$, organic sulfonates such as $CH_3SO_3Li$ and $CF_3SO_3Li$, and sulfonyl imide salts such as $(CF_3SO_2)_2NLi$, $(CF_3CF_2SO_2)_2NLi$, and $(CF_3SO_2)(CF_3CF_2SO_2)NLi$.

Alkali metal salts other than Li salts, for example, salts of alkali metals such as sodium and potassium, can also be used as cationic species of the electrolyte salts. Cationic species such as aliphatic quaternary ammonium salt, imidazolium salt, pyridinium salt, and piperidinium salt can also be used.

The ratio of the weight of the electrolyte salts mentioned above relative to the total weight of the polymer material mentioned above and the electrolyte salt mentioned above is preferably 1 to 90 wt %, and more preferably 5 to 75 wt %.

The formation of a composite of the polymer material and the electrolyte salt mentioned above can provide a polymer electrolyte. For example, the following methods of forming composites have been known:

1. A method for obtaining a polymer electrolyte by dissolving a polymer material and an electrolyte salt in a solvent that can dissolve both of them, and then removing part or the whole of the solvent (method 1).
2. A method for obtaining a polymer electrolyte by first forming a polymer material into a film or the like, then impregnating it into a solution dissolving an electrolyte salt in a solvent to swell followed by removing part or the whole of the solvent (method 2).
3. A method for obtaining a polymer electrolyte by melting and kneading a polymer material and an electrolyte salt (method 3).
4. A method for obtaining a polymer electrolyte by dissolving an electrolyte salt in a liquid monomer or prepolymer, which is then polymerized to (method 4).

In the present invention, a method of forming a composite of a polymer material and an electrolyte salt can be selected from methods 1 to 4 above as needed. A description of the composite formation methods is given below.

Solvents used for composite formation using method 1 include water and/or nonaqueous solvents. Such nonaqueous solvents include cyclic carbonates such as propylene carbonate, ethylene carbonate, vinylene carbonate, chain carbonates such as diethyl carbonate, dimethyl carbonate, ethyl methyl carbonate, cyclic esters such as γ-butyrolactone, chain esters such as ethyl acetate and methyl acetate, ketones such as acetone and methyl ethyl ketone, alcohols such as methanol and ethanol, ethers such as tetrahydrofuran, 1,4-dioxane, and 1,2-dimethoxyethane, nitriles such as acetonitrile and benzonitrile, amides such as dimethylformamide, dimethylacetamide, N-methylpyrrolidone, and sulfolanes.

In addition, as a variation of method 1, a solution containing an electrolyte salt dissolved in water or an organic solvent at high concentration can be used. This variation is useful especially for a high content of the ketonic carbonyl group in the polymer material used in the present invention.

The polymer electrolyte of the present invention can be obtained by fabricating the solution obtained by this method into any shape like sheet by using a process such as application, casting, or extrusion and then removing part or the whole of the solvent. In addition, by mixing a cathode active material or an anode active material into the solution and then fabricating it into a shape like sheet similarly, followed by removing part or the whole of the solvent electrodes for electrochemical devices using the polymer electrolyte of the present invention can be obtained.

The removal of part or the whole of the solvent can be controlled by using a hot plate, an oven, a temperature-programmable heating oven, or the like. Drying conditions depend on the type and amount of the solvent to be removed. For example, the conditions of a temperature of 50 to 250° C. and a duration of about 30 minutes to 10 hours can preferably be used. In addition, a vacuum dryer may also be used for drying under reduced pressure.

The polymer electrolyte of the present invention may be used as a polymer electrolyte as it is and may also be used after it is crosslinked as needed. Common crosslinking methods include electron beam crosslinking and chemical crosslinking using ammonia, diamines, radical generators, or the like.

For composite formation using method 2, the polymer material of the present invention that has been fabricated into a shape like film in advance is impregnated into a solution of an electrolyte salt dissolved in a solvent, and is allowed to swell. Then, the polymer electrolyte of the present invention can be obtained by removing part or the whole of the solvent. In method 2, the same solvent as in method 1 can be used. In addition, electrodes for electrochemical devices using the polymer electrolyte of the present invention can be obtained by mixing and kneading a cathode active material or an anode active material into the polymer material of the present invention in advance, fabricating the kneaded polymer material into a shape like sheet, and then impregnating the fabricated polymer material into a solution of an electrolyte salt dissolved in a solvent followed by removing part or the whole of the solvent.

For composite formation using method 3, the polymer electrolyte can directly be obtained by melting and kneading the polymer material of the present invention and an electrolyte salt, and fabricating the kneaded polymer material into a shape like sheet. In addition, electrodes for electrochemical devices using the polymer electrolyte of the present invention can directly be obtained by melting and kneading the polymer material of the present invention, an electrolyte salt, and a cathode active material or an anode active material, and then fabricating the kneaded polymer material into a shape like film.

If the polymer material of the present invention is obtained from a liquid monomer, method 4 can also be used. In this case, the polymer electrolyte of the present invention can be obtained by polymerizing a mixture of the liquid monomer and an electrolyte salt as well as a solvent if necessary. In addition, electrodes for electrochemical devices using the polymer electrolyte of the present invention can be obtained by mixing a cathode active material or an anode active material into that mixture and then polymerizing the mixture in a shape like sheet.

A first aspect of the polymer electrolyte of the present invention is an all-solid-state polymer electrolyte. Specifically, if the whole solvent is removed in method 1, 2, or 4 above, an all-solid-state polymer electrolyte consisting of a polymer material having a ketonic carbonyl group wherein the ratio of the weight of the ketonic carbonyl group relative to the weight of the polymer material is 15 wt % to 50 wt % and an electrolyte salt can be obtained. In addition, according to method 3 above, an all-solid-state polymer electrolyte can directly be obtained. The amount of the solvent remaining after drying can be measured by NMR measurement, and if the concentration of the solvent is 1000 ppm or less, the whole solvent shall be considered to have been removed.

The all-solid-state polymer electrolytes of the present invention are characterized by very high ion conductivity, and there are some all-solid-state polymer electrolytes having ion conductivity comparable to that of liquid electrolytes. The reason why the all-solid-state polymer electrolytes of the present invention have high ion conductivity is unclear, and it seems that a ketonic carbonyl group contained in a polymer interacts strongly with ions.

All-solid-state polymer electrolytes using polyethylene oxide polymers having ether linkages or their copolymers or the like have been known. However, any of them has much lower ion conductivity than liquid electrolytes and is not practical.

As mentioned above, the all-solid-state polymer electrolyte of the present invention does not contain any liquid electrolyte, but it has high ion conductivity. When it is used in nonaqueous electrochemical devices such as lithium primary batteries, lithium-ion secondary batteries, and nonaqueous electric double layer capacitors, it exhibits the following effects:

1. It exhibits high output characteristics that are comparable to those of liquid electrolytes.
2. It is all-solid-state, eliminating the possibility of liquid leakage.
3. It contains no flammable liquid materials and thereby has no flammability.
4. It has excellent pliability and fabricability and thereby can be fabricated into any shape like thin film.
5. If it is used as a bipolar electrode in which a cathode active material and an anode active material are arranged on the front side and back side of a current collector, respectively, then there is no possibility of ionic liquid junctions between the cathode and anode formed on the front side and back side of the current collector that could occur with liquid electrolytes, and electrochemical devices having a high electromotive force of a few tens of volts or more can easily be manufactured.

As mentioned above, an all-solid polymer electrolyte of the polymer electrolytes of the present invention can be used to improve the reliability, safety, and characteristics of electrochemical devices greatly.

A second aspect of the polymer electrolyte of the present invention is a gel-state polymer electrolyte. Specifically, if part of the solvent is removed in method 1, 2, or 4 above, an apparently solid gel-state polymer electrolyte consisting of a polymer material having a ketonic carbonyl group wherein the ratio of the weight of the ketonic carbonyl group relative to the weight of the polymer material is 15 wt % to 50 wt %, an electrolyte salt and a solvent can be obtained.

In the gel-state polymer electrolyte of the present invention, the composition ratio of the solvent remaining after partial solvent removal and the polymer material is adjusted according to the intended use by changing conditions for solvent removal. However, the ratio of the weight of the solvent relative to the total weight of the solvent and the polymer material of the present invention is preferably less than 70 wt %, more preferably less than 50 wt %, and most preferably less than 33.3 wt %.

As mentioned above, the polymer electrolytes of the present invention, even an all-solid-state polymer electrolyte, have a sufficiently high ion conductivity. Therefore, even if such a polymer electrolyte is made into a gel-state polymer electrolyte with part of the solvent left and thereby its ion conduction, especially at low temperature, is further enhanced, then it exhibits its effects in a smaller amount of the solvent than the conventional gel-state polymer electrolytes, so reliability such as liquid leakage resistance is reduced less often.

A more detailed description of the gel-state polymer electrolyte of the present invention is given below.

In the present invention, an aqueous gel-state polymer electrolyte obtained when the solvent is water almost completely maintains high ion conductivity that the aqueous electrolytic solution originally has. Therefore, such aqueous gel-state polymer electrolytes are useful because when they are used in aqueous electrochemical devices such as aqueous ion batteries and aqueous electric double layer capacitors, the output characteristics, low temperature characteristics, and the like do not decrease and the reliability is greatly improved.

In addition, a nonaqueous gel-state polymer electrolyte obtained when the solvent is nonaqueous almost completely maintains the ion conductivity that the nonaqueous electrolytic solution has, and especially high ion conductivity at low temperature. Therefore, such gel-state polymer electrolytes are useful for nonaqueous electrochemical devices such as lithium primary batteries, lithium-ion secondary batteries, nonaqueous electric double layer capacitors, dye-sensitized solar cells, and electrochromic devices.

As mentioned above, the polymer material of the present invention having a ketonic carbonyl group wherein the ratio of the weight of the ketonic carbonyl group relative to the weight of the polymer material is 15 wt % to 50 wt % can be used to provide polymer electrolytes having high ion conductivity, and can be used in various electrochemical devices as an all-solid-state polymer electrolyte or a gel-state polymer electrolyte depending on the intended use. Here, an electrochemical device refers to a device that uses electrochemical phenomena involving ions, and examples of electrochemical devices include electricity storage devices, electricity generating devices, display devices, and sensor devices.

Examples of electrochemical devices using the polymer electrolytes of the present invention are shown below.

FIG. 1 shows a plan view and a longitudinal sectional view of an example of the electrochemical devices of the present invention. In FIG. 1, reference number 1 indicates a cathode, reference number 2 an anode, reference number 3 a cathode lead terminal, reference number 4 an anode lead terminal, reference number 5 a polymer electrolyte, and reference number 6 a battery container.

Examples of such electrochemical devices include lithium primary batteries with metallic lithium as the anode and manganese dioxide, carbon fluoride, or the like as the cathode; lithium-ion secondary batteries with a carbon material, a metal oxide, a lithium alloy, or the like as the anode and lithium cobaltate, lithium nickelate, lithium manganate, lithium iron phosphate, or the like as the cathode; electric double layer capacitors with activated carbon as the cathode and the anode; aqueous ion batteries with a lithium-transition metal composite oxide such as vanadium, titanium, or iron as the anode and a lithium-transition metal composite oxide such as cobalt, manganese, or iron as the cathode.

EXAMPLES

The present invention is explained below in more detail with Examples and Comparative Examples.

Reference Example 1

Manufacture of Polymer Material A

First, 15 parts by weight of methyl vinyl ketone, 0.1 parts by weight of azobisisobutyronitrile as a polymerization initiator, and 100 parts by weight of toluene as a polymerization solvent were mixed together and then polymerized at 80° C. for 10 hours. After completion of polymerization, the remaining monomers and solvent were removed under reduced pressure to obtain polymer material A.

13C-NMR analysis showed that the ratio of the weight of the carbonyl group relative to the overall weight of this polymer material was 40.0% as shown in Table 1. The weight-average molecular weight of this polymer material A was 92,000.

Reference Examples 2 to 7

Manufacture of Polymer Materials B to G

The same operations as in Reference Example 1 except the use of mixtures of methyl vinyl ketone and acrylonitrile having the monomer ratios shown in Table 1 instead of the use of only methyl vinyl ketone were conducted to obtain polymer materials B to G.

13C-NMR analysis showed that the copolymer molar ratios and the ratios of the weight of the carbonyl group relative to the overall weight of the copolymer were as shown in Table 1. The weight-average molecular weights of these polymer materials B, C, D, E, F, and G were 115,000, 173,000, 225,000, 245,000, 270,000, and 286,000, respectively.

Reference Example 8

Manufacture of Polymer Material H

First, 15 parts by weight of ethyl vinyl ketone, 0.1 parts by weight of azobisisobutyronitrile as a polymerization initiator, and 100 parts by weight of toluene as a polymerization solvent were mixed together and then polymerized at 80° C. for 10 hours. After completion of polymerization, the remaining monomers and solvent were removed under reduced pressure to obtain polymer material H.

13C-NMR analysis showed that the ratio of the weight of the carbonyl group relative to this polymer material was 33.3% as shown in Table 2. The weight-average molecular weight of this polymer material H was 67,000.

Reference Examples 9 and 10

Manufacture of Polymer Material I and J

The same operations as in Reference Example 8 except the use of mixtures of ethyl vinyl ketone and methyl acrylate or methyl vinyl ether having the monomer ratios shown in Table 2 instead of the use of only ethyl vinyl ketone were conducted to obtain polymer materials I to J.

13C-NMR analysis showed that the copolymer molar ratios and the ratios of the weight of the carbonyl group relative to the overall weight of the copolymer were as shown in Table 2. The weight-average molecular weights of these polymer materials I and J were 145,000 and 43,000, respectively.

TABLE 2

| | Monomer ratio (Parts by weight) | | | Molar ratio of the methyl vinyl ketone in the polymer | Weight ratio of the carbonyl group in the polymer (wt %) |
|---|---|---|---|---|---|
| | Ethyl vinyl ketone | Methyl acrylate | Methyl vinyl ether | | |
| Reference Example 8 (H) | 15.0 | 0 | 0 | 1.0 | 33.3 |

TABLE 1

| | Monomer ratio (Parts by weight) | | Molar ratio of the methyl vinyl ketone in the polymer | Weight ratio of the carbonyl group in the polymer (wt %) |
|---|---|---|---|---|
| | Methyl vinyl ketone | Acrylonitrile | | |
| Reference Example 1 (A) | 15.0 | 0 | 1.0 | 40.0 |
| Reference Example 2 (B) | 12.0 | 3.0 | 0.71 | 30.7 |
| Reference Example 3 (C) | 10.0 | 5.0 | 0.55 | 24.9 |
| Reference Example 4 (D) | 8.5 | 6.5 | 0.43 | 20.2 |
| Reference Example 5 (E) | 6.5 | 8.5 | 0.33 | 15.9 |
| Reference Example 6 (F) | 6.0 | 9.0 | 0.28 | 13.7 |
| Reference Example 7 (G) | 3.5 | 11.5 | 0.14 | 7.2 |

TABLE 2-continued

| | Monomer ratio (Parts by weight) | | | Molar ratio of the methyl vinyl ketone in the polymer | Weight ratio of the carbonyl group in the polymer (wt %) |
|---|---|---|---|---|---|
| | Ethyl vinyl ketone | Methyl acrylate | Methyl vinyl ether | | |
| Reference Example 9 (I) | 12.0 | 3.0 | 0 | 0.78 | 25.9 |
| Reference Example 10 (J) | 9.0 | 0 | 6.0 | 0.61 | 23.1 | from JEOL Ltd. The ion conductivity of this gel-state polymer electrolyte was measured at 30° C. and 0° C. at 1 kHz AC. Results are shown in Table 3.

Examples 2 to 8 and Comparative Examples 1 to 2

The same operations as in Example 1 except the use of polymer materials B to J instead of the use of polymer material A were conducted.

The weight ratios of the carbonyl group in the polymer material, the weight ratios of the solvent, ion conductivity, the conditions of the polymer electrolytes, and the like were as shown in Table 3.

TABLE 3

| | Weight ratio of the carbonyl group in the polymer (wt %) | Solvent/(solvent + polymer) (wt %) | Ion conductivity (mScm$^{-1}$) Upper: 30° C. Lower: 0° C. | Conditions of the polymer electrolyte |
|---|---|---|---|---|
| Example 1 | 40.0 (A) | 26.3 | 2.9<br>2.2 | Free-standing film without liquid exudation |
| Example 2 | 30.7 (B) | 25.6 | 2.8<br>2.1 | Free-standing film without liquid exudation |
| Example 3 | 24.9 (C) | 21.5 | 2.6<br>1.9 | Free-standing film without liquid exudation |
| Example 4 | 20.2 (D) | 24.6 | 2.2<br>1.4 | Free-standing film without liquid exudation |
| Example 5 | 15.9 (E) | 20.9 | 1.1<br>0.5 | Free-standing film without liquid exudation |
| Example 7 | 25.9 (I) | 25.1 | 2.9<br>2.0 | Free-standing film without liquid exudation |
| Example 8 | 23.1 (J) | 23.9 | 2.7<br>1.9 | Free-standing film without liquid exudation |
| Comparative Example 1 | 13.7 (F) | 29.3 | 0.3<br>0.1 | Brittle film with liquid exudation |
| Comparative Example 2 | 7.2 (G) | 27.8 | 0.1<br>0.03 | Brittle film with liquid exudation |
| Example 6 | 33.3 (H) | 22.3 | 2.8<br>1.8 | Free-standing film without liquid exudation |

Example 1

First, 30 parts by weight of lithium tetrafluoroborate (LiBF4) as an electrolyte salt was mixed into and dissolved in 70 parts by weight of γ-butyrolactone to prepare a 30 wt % solution. Next, 95 parts by weight of polymer material A and 100 parts by weight of this solution were placed and then heated and stirred at 120° C. to obtain a viscous, clear solution.

When this viscous solution was cast to have a thickness of 500 micrometers on a glass plate and then dried at 120° C. for 2 hours at normal pressure, a gel-state polymer electrolyte in film form was obtained.

13C-NMR measurement at this time showed that the ratio of weight of the γ-butyrolactone relative to the total weight of polymer material A and the γ-butyrolactone was 26.3 wt %. The NMR measurement was conducted with JNM-LA400

Example 9

First, 40 parts by weight of lithium bis(trifluoromethanesulfonyl)imide {(CF3SO2)2NLi} as an electrolyte salt was mixed into and dissolved in 60 parts by weight of propylene carbonate to prepare a 40 wt % solution. Next, 100 parts by weight of this solution and 75 parts by weight of polymer material J were placed in an autoclave and then heated and stirred at 120° C. to obtain a viscous, clear solution.

When this viscous solution was cast to have a thickness of 500 micrometers on a glass plate and then dried at 150° C. for 2 hours at normal pressure, a gel-state polymer electrolyte in film form was obtained.

The ratio of the weight of the propylene carbonate relative to the total weight of this polymer material and the propylene carbonate was 27.3 wt %. The ion conductivity of this gel-state polymer electrolyte at 30° C. and 0° C. at 1 kHz AC, the conditions of the polymer electrolyte, and the like were as shown in Table 4.

Example 10

When the same operations as in Example 9 except drying at 150° C. for 3 hours were conducted, a gel-state polymer electrolyte in film form having almost no viscosity was obtained.

The ratio of the weight of the propylene carbonate relative to the total weight of this polymer material and the propylene carbonate was 16.1 wt %. The ion conductivity of this gel-state polymer electrolyte at 30° C. and 0° C. at 1 kHz AC, the conditions of the polymer electrolyte, and the like were as shown in Table 4.

Example 11

When the same operations as in Example 9 except drying at 150° C. for 6 hours were conducted, a gel-state polymer electrolyte in film form having no viscosity was obtained.

The ratio of the weight of the propylene carbonate relative to the total weight of this polymer material and the propylene carbonate was 7.8 wt %. The ion conductivity of this gel-state polymer electrolyte at 30° C. and 0° C. at 1 kHz AC, the conditions of the polymer electrolyte, and the like were as shown in Table 4.

Example 12

First, 50 parts by weight of lithium bis(trifluoromethanesulfonyl)imide {(CF3SO2)2NLi} as an electrolyte salt was mixed into and dissolved in 50 parts by weight of propylene carbonate to prepare a 50 wt % solution. Next, 100 parts by weight of this solution and 75 parts by weight of polymer material J were placed in an autoclave and then heated and stirred at 120° C. to obtain a viscous, clear solution.

This viscous solution was cast to have a thickness of 500 micrometers on a glass plate and then dried at 150° C. for 1 hour at normal pressure. Then, when the plate was placed in a vacuum dryer set at 150° C. and further dried for 10 hours, an all-solid-state polymer electrolyte in film form having a propylene carbonate content of 1000 ppm or less was obtained.

The ion conductivity of this all-solid-state polymer electrolyte at 30° C. at 1 kHz AC was measured. Results are shown in Table 4.

Comparative Example 3

First, 100 parts by weight of a copolymer of vinylidene fluoride having a weight-average molecular weight of 35,000 and hexafluoropropylene (having a copolymerization ratio of 88:12, hereinafter referring to as polymer material K), 25 parts by weight of lithium bis(trifluoromethanesulfonyl)imide {(CF3SO2)2NLi} as an electrolyte salt, 120 parts by weight of propylene carbonate, and 200 parts by weight of dimethylformamide were mixed together and dissolved at 60° C.

When this solution was cast to have a thickness of 500 micrometers on a glass plate and then dried at 120° C. for 2 hours at normal pressure, a gel-state polymer electrolyte in film form having strong adherence was obtained.

At this time, the ratio of the weight of the propylene carbonate relative to the total weight of polymer material K and the propylene carbonate was 45.3 wt %, and no dimethylformamide remained. The ion conductivity of this gel-state polymer electrolyte at 30° C. and 0° C. at 1 kHz AC was measured. Results are shown in Table 5.

Comparative Example 4

When the same operations as in Comparative Example 3 except drying at 150° C. for 3 hours were conducted, a gel-state polymer electrolyte in film form having almost no viscosity was obtained.

At this time, the ratio of the weight of the propylene carbonate relative to the total weight of polymer material K and the propylene carbonate was 24.8 wt %. The ion conductivity of this gel-state polymer electrolyte at 30° C. and 0° C. at 1 kHz AC was measured. Results are shown in Table 5.

Comparative Example 5

When the same operations as in Comparative Example 3 except drying at 150° C. for 6 hours were conducted, a very brittle gel-state polymer electrolyte in film form was obtained.

At this time, the ratio of the weight of the propylene carbonate relative to the total weight of polymer material K and the propylene carbonate was 16.8 wt %. The ion conductivity of this gel-state polymer electrolyte at 30° C. and 0° C. at 1 kHz AC was measured. Results are shown in Table 5.

Comparative Example 6

A solution containing polymer material K obtained in the same way as in Comparative Example 3 and an electrolyte salt

TABLE 4

| | Weight ratio of the carbonyl group in the polymer (wt %) | Solvent/(solvent + polymer) (wt %) | Ion conductivity (mScm$^{-1}$) Upper: 30° C. Lower: 0° C. | Conditions of the polymer electrolyte |
|---|---|---|---|---|
| Example 9 | 23.1 | 27.3 | 2.5<br>2.1 | Free-standing film without liquid exudation |
| Example 10 | 23.1 | 16.1 | 2.2<br>1.7 | Free-standing film without liquid exudation |
| Example 11 | 23.1 | 7.8 | 1.9<br>1.5 | Free-standing film without liquid exudation |
| Example 12 | 23.1 | 0 | 1.1<br>0.3 | Free-standing film without liquid exudation | was cast to have a thickness of 500 micrometers on a glass plate and then dried at 120° C. for 2 hours at normal pressure. Then, when the plate was placed in a vacuum dryer set at 150° C. and further dried for 10 hours, no film was obtained, but a mixture in white powder was obtained.

The content of propylene carbonate in this mixture was 1000 ppm or less, and the ion conductivity was unmeasurable.

Comparative Example 7

First, 100 parts by weight of a polyether copolymer (having a copolymerization ratio of 73:27, hereinafter referring to as polymer material L) of ethylene oxide having a weight-average molecular weight of 14,000 and 2-(2-methoxyethoxy-ethyl)glycidyl ether and 25 parts by weight of lithium bis (trifluoromethanesulfonyl)imide {$(CF_3SO_2)_2NLi$} as an electrolyte salt were mixed into and dissolved in 250 parts by weight of acetonitrile.

When this solution was cast to have a thickness of 500 micrometers on a glass plate and then dried at 80° C. for 2 hours at normal pressure, acetonitrile volatilized completely and an all-solid-state polymer electrolyte in film form was obtained.

The ion conductivity of this all-solid-state polymer electrolyte at 30° C. and 0° C. at 1 kHz AC was measured. Results are shown in Table 5.

TABLE 5

| | (Weight of solvent)/(Weight of solvent + polymer) (wt %) | Ion conductivity (mScm$^{-1}$) Upper: 30° C. Lower: 0° C. | Conditions of the polymer electrolyte |
|---|---|---|---|
| Comparative Example 3 | 45.3 | 0.93 0.29 | Non-free-standing film having high viscosity with liquid exudation |
| Comparative Example 4 | 24.8 | 0.39 0.13 | Free-standing film having slight viscosity with liquid exudation |
| Comparative Example 5 | 16.8 | 0.09 0.01 | Brittle film |
| Comparative Example 6 | 0 | Unmeasurable Unmeasurable | In powder form |
| Comparative Example 7 | 0 | 0.11 0.03 | Free-standing film |

Example 13

This example is an example of the electrochemical devices of the present invention using the gel-state polymer electrolyte of the present invention. FIG. 1 shows a schematic sectional view of this electrochemical device.

<Preparation of a Polymer Electrolyte Solution>
Polymer Electrolyte Solution (1)
Lithium tetrafluoroborate (LiBF4), propylene carbonate, and polymer material A were placed at a weight ratio of 20:80:100 and then heated and stirred at 120° C. to obtain a viscous solution.

Polymer Electrolyte Solution (2)
Lithium tetrafluoroborate (LiBF4), propylene carbonate, and polymer material A were placed at a weight ratio of 40:60:60 and then heated and stirred at 120° C. to obtain a solution.

<Preparation of a Cathode Sheet>
LiCoO2 (having an average particle size of 5 micrometers) as a cathode active material and graphite and acetylene black as conducting aids were dry blended at a weight ratio of 100:52.5.

Then, 100 parts by weight of polymer electrolyte solution (1) and 100 parts by weight of the mixture of the cathode active material and conducting aids were kneaded into paste. This paste was then applied to have a thickness of 200 micrometers to one side of a 15-micrometer-thickness aluminum foil cathode collector. This was dried at 150° C. for 2 hours to obtain a cathode sheet.

The ratio of the weight of propylene carbonate contained in this cathode sheet relative to the overall weight of the cathode sheet excluding the aluminum foil cathode collector was 13.8 wt %.

<Preparation of an Anode Sheet>
First, 100 parts by weight of polymer electrolyte solution (1) and 50 parts by weight of graphite (having an average particle size of 10 micrometers) as an anode active material were kneaded into paste, and this paste was then applied to have a thickness of 150 micrometers to one side of an 18-micrometer-thickness copper foil anode collector. This was dried at 150° C. for 2 hours to obtain an anode sheet.

The ratio of the weight of propylene carbonate contained in this anode sheet relative to the overall weight of the anode sheet excluding copper foil anode collector was 17.1 wt %.

<Preparation of an Electrochemical Device>
Polymer electrolyte solution (2) was applied to the surface of the cathode sheet prepared above, which was then dried at 100° C. for 1 hour to form a coating layer having a thickness of 20 micrometers.

The cathode sheet having this coating layer and the anode sheet prepared above were overlapped to assemble an electrochemical device as shown in FIG. 1.

<Evaluation of Characteristics of an Electrochemical Device>
The charge and discharge characteristics of this electrochemical device were evaluated in the following way. This device was charged for 5 hours in the constant current and constant voltage charge mode of a maximum current of 50 mA and a maximum voltage of 4.2 V and then discharged to 3.0 V at a constant current of 10 mA. The discharge capacity was 72.4 mAh. After that, the device was recharged under the same conditions and evaluated for discharge capacity under the constant current conditions shown in Table 6. Results are shown in Table 6.

Example 14

This example is an example of the electrochemical devices of the present invention using the all-solid-state polymer electrolyte of the present invention. FIG. 1 shows a schematic sectional view of this electrochemical device.

<Preparation of a Cathode Sheet>

A mixture of a cathode active material and conducting aids obtained in the same way as in Example 13, lithium bis(pentafluoroethanesulfonyl)imide {(CF3CF2SO2)2NLi}, propylene carbonate, and polymer material I were placed at a weight ratio of 100:20:30:50 and then heated and kneaded at 150° C.

This kneaded mixture was extruded into sheet having a thickness of 200 micrometers on a 15-micrometer-thickness aluminum foil cathode collector. After that, this sheet was dried at 180° C. for 2 hours to obtain a cathode sheet.

The content of propylene carbonate contained in this cathode sheet relative to the overall weight of the cathode sheet excluding the aluminum foil cathode collector was 1000 ppm or less.

<Preparation of an Anode Sheet>

Graphite (having an average particle size of 10 micrometers) as an anode active material, lithium bis(pentafluoroethanesulfonyl)imide {(CF3CF2SO2)2NLi}, propylene carbonate, and polymer material I were placed at a weight ratio of 50:20:30:50 and then heated and kneaded at 150° C.

This kneaded mixture was extruded into sheet having a thickness of 150 micrometers on an 18-micrometer-thickness copper foil anode collector. After that, this sheet was dried at 180° C. for 2 hours to obtain an anode sheet.

The content of propylene carbonate contained in this anode sheet relative to the overall weight of the anode sheet excluding the copper foil anode collector was 1000 ppm or less.

<Preparation of an Electrochemical Device>

Lithium bis(pentafluoroethanesulfonyl)imide {(CF3CF2SO2)2NLi}, propylene carbonate, and polymer material I were placed at a weight ratio of 20:30:50 and heated and kneaded at 150° C.

This kneaded mixture was extruded into sheet having a thickness of 20 micrometers on the surface of the cathode sheet prepared above, and then overlapped by the anode sheet prepared above. This group of electrodes was dried at 180° C. for 2 hours and then assembled into the electrochemical device shown in FIG. 1.

<Evaluation of Characteristics of the Electrochemical Device>

The charge and discharge characteristics of this electrochemical device were evaluated in the same way as in Example 13. Results are shown in Table 6.

Comparative Example 8

This example is a Comparative Example of an electrochemical device using a polyether all-solid-state polymer electrolyte. FIG. 1 shows a schematic sectional view of this electrochemical device.

<Preparation of Polymer Electrolyte Solution (3)>

Lithium bis(pentafluoroethanesulfonyl)imide {(CF3CF2SO2)2NLi} as an electrolyte, acetonitrile as a solvent, and polymer material L were placed at a weight ratio of 10:100:40 and then mixed and stirred to obtain a solution.

<Preparation of a Cathode Sheet>

The same operations as in Example 13 except the use of polymer electrolyte solution (3) instead of polymer electrolyte solution (1) and drying at 80° C. were conducted to obtain a cathode sheet.

The content of acetonitrile contained in this cathode sheet relative to the overall weight of the cathode sheet excluding the aluminum foil cathode collector was 1000 ppm or less.

<Preparation of an Anode Sheet>

The same operations as in Example 13 except the use of polymer electrolyte solution (3) instead of polymer electrolyte solution (1) and drying at 80° C. were conducted to obtain an anode sheet.

The content of acetonitrile contained in this anode sheet relative to the overall weight of the anode sheet excluding the copper foil anode collector was 1000 ppm or less.

<Preparation of an Electrochemical Device>

Polymer electrolyte solution (3) was applied to the surface of the cathode sheet prepared above, which was then dried at 80° C. for 2 hours to form a coating layer having a thickness of 20 micrometers.

The cathode sheet having this coating layer and the anode sheet prepared above were overlapped to assemble the electrochemical device shown in FIG. 1.

<Evaluation of Characteristics of the Electrochemical Device>

The charge and discharge characteristics of this electrochemical device were evaluated in the same way as in Example 13. Results are shown in Table 6.

TABLE 6

| | Discharge conditions (mA) and discharge capacity (mAh) | | |
|---|---|---|---|
| | 10 mA | 50 mA | 100 mA |
| Example 13 | 72.4 mAh | 71.3 mAh | 63.3 mAh |
| Example 14 | 70.1 mAh | 65.3 mAh | 61.0 mAh |
| Comparative Example 8 | 11.4 mAh | 5.3 mAh | Undischargeable |

INDUSTRIAL APPLICABILITY

The polymer electrolytes of the present invention can be used for nonaqueous primary batteries such as metallic lithium batteries, aqueous secondary batteries such as aqueous ion batteries, nonaqueous secondary batteries such as lithium-ion secondary batteries, nonaqueous electric double layer capacitors, hybrid capacitors, and other electrochemical devices.

BRIEF DESCRIPTION OF THE DRAWING

FIG. 1 is a plan view and a longitudinal sectional view of an example of the electrochemical devices of the present invention.

DESCRIPTION OF REFERENCE NUMERALS

1 Cathode
2 Anode
3 Cathode lead terminal
4 Anode lead terminal
5 Polymer electrolyte
6 Battery container

The invention claimed is:

1. A polymer electrolyte being an all-solid-state polymer electrolyte comprising a polymer material having a ketonic carbonyl group and an electrolyte salt, wherein the ketonic carbonyl group is present in side chains of the polymer material, a weight-average molecular weight of the polymer material is 43,000 to 245,000, the ratio of the weight of the ketonic carbonyl group relative to the weight of the polymer material is 15 wt % to 50 wt %, and the ratio of the weight of the electrolyte salt relative to the total weight of the polymer material and the electrolyte salt is 5 to 75 wt %.

2. A polymer electrolyte being gel-state polymer electrolyte comprising a polymer material having a ketonic carbonyl group, an electrolyte salt and a solvent, wherein the ketonic carbonyl group is present in side chains of the polymer material, weight-average molecular weight of the polymer material is 43,000 to 245,000, the ratio of the weight of the ketonic carbonyl group relative to the weight of the polymer material is 15 wt % to 50 wt %, the ratio of the weight of the electrolyte salt relative to the total weight of the polymer material and the electrolyte salt is 5 wt % to 75 wt %, and the ratio of the weight of the solvent relative to the total weight of the solvent and the polymer material is more than 0 wt % and less than 33.3 wt %.

3. An electrochemical device using the polymer electrolyte according to claim 1 or 2.

* * * * *